(12) United States Patent
Tian

(10) Patent No.: US 11,814,175 B1
(45) Date of Patent: Nov. 14, 2023

(54) UNMANNED AERIAL VEHICLE (UAV) DELIVERY STRUCTURE

(71) Applicant: Autoflight (Kunshan) Co., Ltd., Kunshan (CN)

(72) Inventor: Yu Tian, Hong Kong (CN)

(73) Assignee: AUTOFLIGHT (KUNSHAN) CO., LTD., Jiangsu Province (CN)

(*) Notice: Subject to any disclaimer, the term of this patent is extended or adjusted under 35 U.S.C. 154(b) by 0 days.

(21) Appl. No.: 18/058,258

(22) Filed: Nov. 22, 2022

(51) Int. Cl.
*B64D 1/22* (2006.01)
*B64U 20/00* (2023.01)
*B64U 101/60* (2023.01)

(52) U.S. Cl.
CPC ............... *B64D 1/22* (2013.01); *B64U 20/00* (2023.01); *B64U 2101/60* (2023.01)

(58) Field of Classification Search
CPC ........ B64D 1/22; F16B 45/023; F16B 45/026; F16B 45/031; B64U 2101/64; B64U 20/00; B64U 2101/60
See application file for complete search history.

(56) References Cited

U.S. PATENT DOCUMENTS

| | | | | |
|---|---|---|---|---|
| D934,663 S | * | 11/2021 | Adelman | F16B 45/023 |
| | | | | D8/356 |
| 11,225,995 B1 | * | 1/2022 | Sharma | F16B 45/037 |
| 11,470,951 B1 | * | 10/2022 | Heanssler | F16B 45/024 |
| 2010/0123042 A1 | * | 5/2010 | Ballard | B64C 39/024 |
| | | | | 701/469 |
| 2018/0327093 A1 | * | 11/2018 | von Flotow | B64C 27/14 |
| 2018/0370772 A1 | * | 12/2018 | Autissier | B66C 1/36 |
| 2019/0010031 A1 | * | 1/2019 | Humble | B64D 1/22 |
| 2019/0193856 A1 | * | 6/2019 | Prager | B64C 39/024 |
| 2019/0233254 A1 | * | 8/2019 | Shin | B64D 1/22 |
| 2019/0322495 A1 | * | 10/2019 | Prager | B64U 10/13 |
| 2020/0361750 A1 | * | 11/2020 | Autissier | B66C 1/36 |
| 2020/0407197 A1 | * | 12/2020 | Hafenrichter | B64D 1/22 |
| 2021/0131481 A1 | * | 5/2021 | Walker | F16B 45/023 |
| 2021/0139291 A1 | * | 5/2021 | Sundar S Iyer | B66C 1/34 |
| 2021/0237901 A1 | * | 8/2021 | von Flotow | B64F 1/02 |
| 2021/0285485 A1 | * | 9/2021 | Lin | F16B 45/023 |
| 2021/0317866 A1 | * | 10/2021 | LeBeau | F16B 45/023 |
| 2021/0359391 A1 | * | 11/2021 | Hong | F16B 1/0071 |
| 2022/0007824 A1 | * | 1/2022 | Chabod | A45F 5/021 |
| 2022/0018384 A1 | * | 1/2022 | Adelman | A44B 15/00 |
| 2022/0143469 A1 | * | 5/2022 | Maurice | F16B 45/021 |
| 2022/0205469 A1 | * | 6/2022 | Gil | B66C 1/12 |
| 2022/0219947 A1 | * | 7/2022 | Przeciechowski | B66C 1/26 |
| 2022/0266074 A1 | * | 8/2022 | Yang | F16B 45/028 |

(Continued)

*Primary Examiner* — Medhat Badawi
(74) *Attorney, Agent, or Firm* — WPAT LAW, P.C.; Anthony King

(57) ABSTRACT

A UAV body and a delivery structure, wherein the delivery structure has a mounting piece, a reset assembly and a limiting piece. The reset piece deforms when the piece to be transported is lifted, which resets to drive the piece to leave the mounting groove when the piece to be transported touches the ground. The first end of the limiting piece is connected to the reset piece, and when the piece to be transported is not lifted, the second end of the limiting piece can be connected to the mounting piece by magnet to seal the opening of the mounting groove. The reset piece drives the limiting piece to move so as to separate the second end from the mounting piece when the piece to be transported is lifted.

9 Claims, 2 Drawing Sheets

(56) References Cited

U.S. PATENT DOCUMENTS

| | | | |
|---|---|---|---|
| 2022/0346254 A1* | 10/2022 | Bonaiti | F16B 45/023 |
| 2022/0361454 A1* | 11/2022 | Phillips | F16B 45/023 |
| 2022/0363518 A1* | 11/2022 | Cox | B66C 1/36 |
| 2023/0009616 A1* | 1/2023 | Rodrigue | B64D 1/10 |

* cited by examiner

UNMANNED AERIAL VEHICLE (UAV) DELIVERY STRUCTURE

FIELD OF THE DISCLOSURE

The application relates to the technical field of UAV manufacturing, in particular to a UAV.

BACKGROUND OF THE INVENTION

With the continuous development of UAV technology, more and more industries and individuals use a UAV for transportation and the delivery of items. The existing UAVs usually use electronic-controlled delivery mechanism to lift the pieces to be transported and release them when they arrive at the destination. However, the control signal is easily affected by obstacles, and the electronically controlled delivery mechanism increases the weight and manufacturing cost of UAV.

As a result, some UAVs use an automatic mechanical delivery structure. Mechanical delivery structures often include a mounting pieces and a reset pieces. During UAV transportation, the mounting piece lifts piece to be transported the piece to be transported, and the reset piece deforms under the weight of the piece to be transported. When the UAV reaches the designated location and the piece to be transported touches the ground, the force of the piece to be transported on the reset assembly disappears. The reset assembly makes the piece to be transported break away from the mounting piece, thus automatic decoupling is realized.

However, the UAV has not yet lifted the piece to be transported which it is just hooked up to the mounting piece, and the piece to be transported still touches with the ground, and the piece to be transported is located near the opening of the mounting groove. At this time, the piece to be transported can be easily separated from the mounting piece under the action of the reset assembly. Thus, an operator needs to press the piece to be transported, which affects UAV operation and transportation efficiency.

SUMMARY OF THE INVENTION

The application aims to provide a UAV, which can realize the automatic delivery of the piece to be transported, and at the same time can conveniently hook the piece to be transported to the delivery structure to ensure UAV transportation efficiency.

To this end, the application uses the following technical solution:

A UAV for delivering a piece to be transported, the UAV comprises a UAV body and a delivery structure, and the delivery structure comprises:

A mounting piece is connected to the UAV body, and a mounting groove is arranged on the mounting piece. The opening direction of the mounting groove extends upward, and the piece to be transported can be hooked into the mounting groove, A reset assembly is configured to deform under the weight of the piece to be transported when it is lifted, and reset to drive the piece to be transported away from the mounting groove when the piece to be transported touches the ground, A limiting piece, the first end of the limiting piece is connected to the reset assembly when the piece to be transported isn't lifted, and the second end of the limiting piece can be connected with the mounting piece by magnetic adsorption to seal the opening of the mounting groove. When the piece to be transported is lifted, the reset assembly can drive the limiting piece to move so as to separate the second end from the mounting piece.

Moreover, the second end of the limiting piece is provided with the first magnetic piece, a second magnetic piece opposite the magnetism of the first magnetic piece is arranged on the mounting part.

Moreover, the first magnetic part and the limiting part are detachable; and/or

The second magnetic part and the mounting part are detachable.

Moreover, the first end of the limiting piece and the reset piece are rotationally connected.

Moreover, a chute connected with the mounting groove is also provided on the mounting piece, the reset assembly is arranged in the chute, the reset piece includes a connected reset piece and a slide block; the reset piece is located between the slide block and the bottom of the chute; the slide block and the chute slide together and are abutted against the piece to be transported, the limiting piece is connected with the slide block.

Moreover, a guide hole is arranged on the slide block, one side of the reset piece near the slide block is penetrated into the guide hole and can be abutted against the top wall of the guide hole.

Moreover, the reset assembly further includes a guide piece arranged at the bottom of the chute, the end of the reset piece away from the slide block is sleeved on the guide piece.

Moreover, the upper side wall of the mounting groove is further provided with an avoidance groove to avoid the sliding of the slide block.

Moreover, one of the side wall of the slide block and the side wall of the slide groove is provided with a protrusion, and the other of the two is provided with a guide groove, the protrusion slides and fits in the guide groove.

Moreover, there are at least two delivery structures, and each delivery structure is connected to the UAV body.

The benefit of the application:

The application discloses a UAV, which comprises a UAV body and a delivery structure, the delivery structure comprises a mounting piece, a reset assembly and a limiting piece. The reset assembly is contacted to the UAV body. The mounting groove is arranged on the mounting piece. The opening direction of the mounting groove extends upward, and the piece to be transported can be hooked into the mounting groove. The reset assembly is configured to deform under the weight of the piece to be transported when it is lifted, and reset to drive the piece to be transported away from the mounting groove when the piece to be transported touches the ground. The first end of the limiting piece is connected to the reset assembly when the piece to be transported isn't lifted, and the second end of the limiting piece can be connected with the mounting piece by magnetic adsorption t to seal the opening of the mounting groove. When the piece to be transported piece to be transported is lifted, the reset assembly can drive the limiting piece to move so as to separate the second end from the mounting piece (1). The UAV can realize the automatic release of the piece to be transported, and limit the position when the piece to be transported is not lifted, so as to avoid the piece to be transported fall from the mounting slot. The limiting piece can open the mounting slot after the UAV lifts the piece to be transported. The application can prevent automatic decoupling of the piece to be transported after landing, thereby enabling the UAV convenience and high transportation efficiency.

Figure 1:
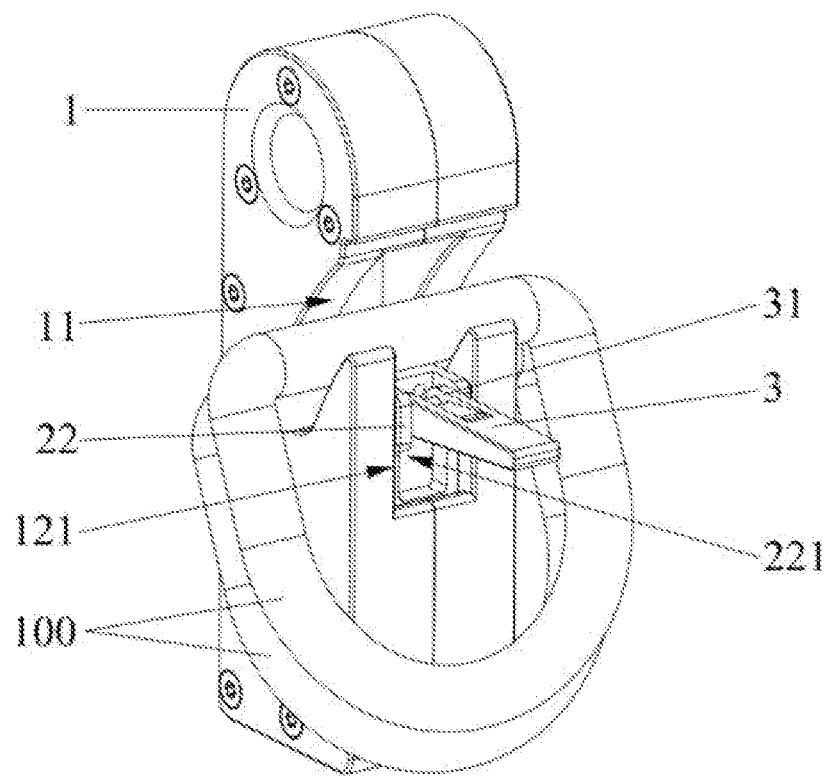
FIG. 1 is the structure diagram of the delivery structure provided by the embodiment in the application.

The following call-out list of elements in the drawing can be a useful guide when referencing the elements of the drawing figures:

1—mounting piece, 2—reset assembly, 3—limiting piece, 4—fasteners, 11—mounting groove, 12—chute, 13—avoidance groove, 21—reset piece, 22—slide block, 23—guide piece, 31—lug part, 100—piece to be transported, 121—avoidance part, 122—guide groove, 221—holding slot, 222—protrusion.

DETAILED DESCRIPTION

In order to make clear the technical problems the solution and the technical affect in the application, which is further described in detail in combination with the attached drawings. Obviously, the embodiments described are only a part of the embodiments of the application rather than all embodiments. Based on the embodiment of the application, all other embodiments obtained by the technical personnel in the field without making creative labor belong to the scope of the protection of the application.

Figure 2:
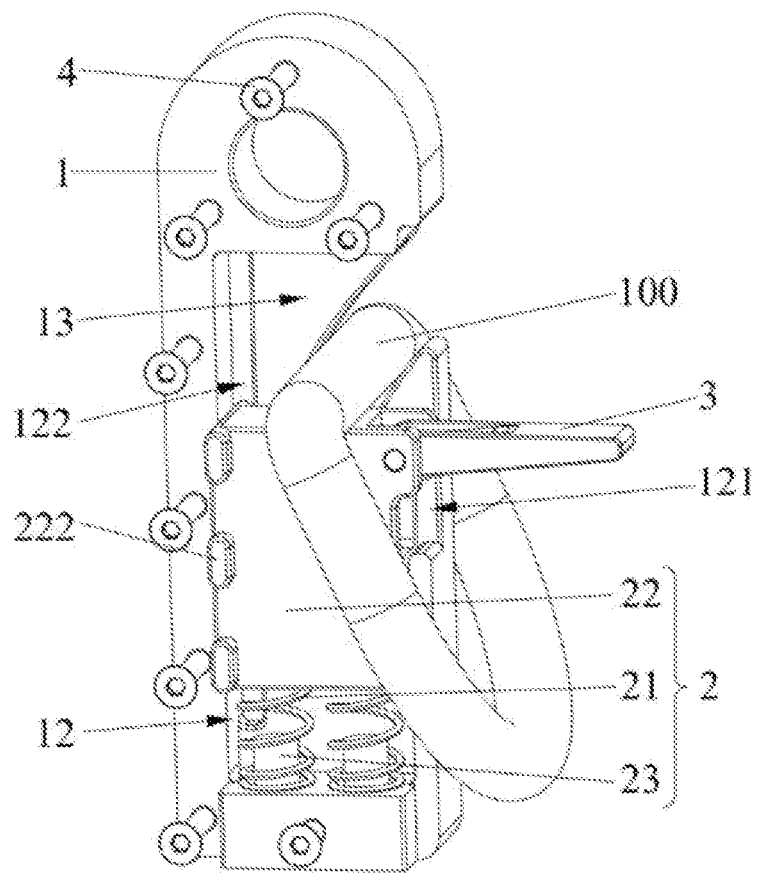
FIG. 2 is the structure diagram of the delivery structure provided by the embodiment in the application.

The application provides a UAV for transporting a piece to be transported 100, as shown in FIGS. 1 and 2. The UAV includes a UAV body and a delivery structure. The delivery structure comprises a mounting piece 1, a reset assembly 2 and a limiting piece 3. The mounting piece 1 is connected to the UAV body, and an mounting groove 11 is arranged on the mounting piece 1, and the opening direction of the mounting groove 11 extends upward, the piece to be transported 100 can be hooked into the mounting groove 11; and the reset assembly 2 is configured to deform under the weight of the piece to be transported 100 when the piece to be transported 100 is lifted, when the piece to be transported 100 touches the ground, the reset assembly 2 resets to drive the piece to be transported 100 move towards the opening direction of the mounting groove 11 and to leave from the mounting groove 11. The first end of the limiting piece 3 is connected to the reset assembly 2, when the piece to be transported 100 is not lifted, the second end of the limiting piece can be connected to the mounting piece 1 by magnetic adsorption to seal the opening of the mounting groove 11, and when the piece to be transported 100 is lifted, the reset assembly 2 can drive the limiting piece 3 to move so that the second end of the limiting piece 3 is separated from the mounting piece 1. Before transporting the piece to be transported 100, the piece to be transported 100 is hooked up to the mounting piece 11, the piece to be transported 100 is not lifted during the process, the limiting piece 3 is then made to block the mounting groove 11 to prevent the piece to be transported 100 to be separated from the mounting groove 11 by the reset action of the reset assembly 2. When the UAV lifts the piece to be transported 100, the piece to be transported 100 moves to the bottom of the mounting groove 11 and deforms the reset assembly 2 under the weight of the piece to be transported 100. The reset assembly 2 drives the limiting piece 3 to move and the second end of the limiting piece 3 is separated from the mounting piece 1, thereby opening the opening of mounting groove 11. When the piece to be transported 100 is being delivered and touches the ground, the force acting on the reset assembly 2 disappears, and the reset assembly 2 resets and drives the piece to be transported 100 to detach from the delivery structure by the mounting groove 11. The UAV can realize the automatic release of the piece to be transported 100 and limit the position by the limiting piece 3 when the piece to be transported 100 is not lifted, so as to avoid the piece to be transported 100 fall from the mounting groove 11. It is no need for the operator to limit the piece to be transported 100 manually. The limiting piece 11 can still open the opening of the mounting groove 11 after lifting so as to prevent automatic decoupling of the parts to be transported 100 after landing, thereby enabling the UAV convenience and high transportation efficiency.

In this embodiment, the piece to be transported 100 can be a cargo holder, a rescue container, or a cargo to be transported, and can be customized according to actual needs. It is not restricted in this embodiment.

In particular, the second end of the limiting piece 3 is provided with the first magnetic piece, and the mounting piece 1 is provided with a second magnetic piece which is opposite to the magnetism of the first magnetic piece, so that when the piece 100 to be transported is not lifted, the first magnetic member and the second magnetic member are able to attract each other so that the limiting piece 3 seals the opening of the mounting groove 11.

Moreover, the first magnetic piece and the second magnetic piece are both permanent magnets, with simple structures and high reliability.

Further, the first magnetic piece and the limiting piece 3 are detachably connected, so that the first magnetic piece can be replaced when it is necessary, and thus reducing the maintenance cost of the delivery structure. Similarly, the second magnetic piece is also detachably connected to mounting piece 1 so that it can be replaced when it is necessary.

Furthermore, the angle between the extending direction of the mounting groove 11 and the vertical direction is 15°-45°, on one hand it can ensure the reliable transportation of the piece to be transported 100 and prevent the piece to be transported 100 to be separated from the mounting groove 11 during transportation, and on the other hand, when the piece to be transported 100 touches the ground, the piece to be transported 100 can be smoothly separated from the mounting groove 11 under the reset action of the reset assembly 2.

Furthermore, the first end of the limiting piece 3 is rotationally connected with the reset assembly 2 so that the limiting piece 3 can rotate and cause the first magnetic piece and the second magnetic piece to attract each other when the piece to be transported 100 is not lifted. When the piece to be transported 100 is lifted, the reset assembly 2 deforms and drives the limiting piece 3 away from the second magnetic piece. At the same time, the second end of the limiting piece 3 rotates downward under the weight of itself, and thus will not affect the automatic delivery of the piece to be transported 100.

Of course, the connection mode of the limiting piece 3 and the reset assembly 2 is not limited. In other embodiments, the limiting piece 3 may also be an elastic arm etc. The first end of the elastic arm is fixed to the reset assembly 2, the first magnetic piece is arranged at the second end of the elastic arm to simplify the connection between the limiting piece 3 and the reset assembly 2. The structure can be customized according to actual needs. The structure is not restricted in this embodiment.

The settings for reset assembly 2 are described below.

In the present embodiment, as shown in FIG. 2, a chute 12 in connection with the mounting groove 11 is further arranged on the mounting piece 1, and the reset assembly 2 is arranged in the chute 12 and is abutted against the piece to be transported 100. The mounting groove 11 can provide a limiting effect on the piece to be transported 100 by providing an additional chute 12 to accommodate the reset assembly 2. That is, the piece to be transported 100 can be hooked into the bottom of the mounting groove 11, and at the same time, the installation of the chute 12 can further reduce the weight of the delivery structure, thereby improving the endurance of the UAV.

Of course, the setting location for the reset assembly 2 is not limited herein. In other embodiments, the reset assembly 2 may be arranged in the mounting groove 11, and both two ends of the reset assembly 2 can be connected with the bottom of the mounting groove 11 and the piece to be transported 100 respectively. The application can be customized according to actual needs, and this embodiment makes no restriction on this.

Furthermore, the chute 12 extends along the vertical direction, and a larger size of the chute 12 can be obtained when the size of the mounting piece 1 is fixed, comparing with the case where the chute 12 extends in an angle with the horizontal direction, the application can provide a larger installation space for the reset assembly 2 and further reduce the weight of the delivery structure.

Furthermore, as shown in FIG. 2, the reset assembly 2 includes a connected reset piece 21 and a slide 22, and the reset piece 21 is located between the bottom of the slide 22 and the chute 12. The slide block 22 slides with the chute 12 and can be connected with the piece to be transported 100, and the limiting piece 3 is connected with the slide block 22. The reliability and stability of the connection of the reset assembly 2 and the piece to be transported 100 can be guaranteed by the connection of the slide block 22 and the piece to be transported 100, and the piece to be transported 100 can be automatically released upon landing. Wherein, the side wall of the slide chute 12 may be provided with an avoidance part 121 to evade the limiting piece 3 when the limiting piece 3 slides with the slide block 22.

In details, as shown in FIG. 1, the first end of the limiting piece 3 is provided with two spaced lug parts 31, each of which is provided with a first connecting hole, and the slider 22 is provided with a holding slot 221. The two opposite side walls of the holding slot 221 are respectively provided with a second connecting hole. The delivery structure also comprises a connecting shaft, which passes through a first connecting hole, two of second connecting holes and another second connecting hole in turn, thus the rotary connection of the limiting piece 3 and the slide block 22 is realized. Wherein, because two lug parts 31 are arranged, the two lug parts 31 can be slightly close to each other under the action of external force when the limiting piece 3 is installed, thus the limiting piece 3 can be conveniently installed on the slider 22. In addition, the arrangement of the two lug parts 31 also facilitates to reduce the overall weight of the delivery structure.

As an example, the reset piece 21 is a spring.

It is understood that the reset piece 21 has a preset stiffness to enable the reset piece 21 to be compressed under the gravity of the piece to be transported 100 during transport. The piece to be transported 100 can approach to the bottom of the mounting groove 11 with a high transportation reliability. When the piece to be transported 100 touches the ground, the reset action of the reset piece 21 can also drive the piece to be transported 100 to remove from the mounting groove 11, then achieve automatic decoupling.

Furthermore, a guide hole is arranged on the slide block 22, and one end of the reset piece 21 near the slide block 22 is sleeved in the guide hole and is abutted against the top wall of the guide hole. On one hand it can provide a limiting effect to the reset piece 21, to ensure the reset effect of the reset piece 21, so that the piece to be transported 100 can automatically unhook, and on the other hand, the connection of the reset piece 21 and the slide block 22 can be simply realized, the number if components used for connection can be reduced, and the manufacturing cost of the delivery structure can be cut.

To further improve the guiding effect on the reset piece 21, the reset assembly 2 also includes a guide piece 23, which is arranged at the bottom of the mounting groove 11. The end of the reset piece 21 which is far from the slide 22 is sleeved on the guide piece 23. The setting of the guide 23 can further improve the guiding function to the reset piece 21, thus further ensuring the reset effect of the reset piece 21. It is understood that the setting of the guide piece 23 will not affect the formation of the slide piece 22 along the vertical direction, since the guide piece 23 can extend into the guide hole when the slide block 22 moves down.

Specifically, the guide piece 23 comprises a thread part and a guide part which are connected sequentially. The first thread hole is arranged on the mounting piece 1; the thread part is matched with the first thread hole, and the reset piece 21 is set on the guide part. The connection of the guide piece 23 and the mounting piece 1 is realized by the matching thread, which can facilitate the assembly of the delivery structure and reduce the manufacturing cost.

Furthermore, the number of the reset piece 21 is at least two, and each reset piece 21 is connected with the slide block 22 to improve the stability of the slide block 22 when sliding in the mounting groove 11, thus further improving the stability and reliability of the contact between the slide block 22 and the piece to be transported 100. In the present embodiment, the number of the reset pieces 21 is two. Two reset pieces 21 are spaced arranged in the mounting groove 11, and the guide hole and the guide piece 23 are respectively arranged one by one with the reset piece 21.

Furthermore, as shown in FIG. 2, one of the side walls of the slide block 22 and the chute 12 is provided with a protrusion 222, and the other of the side walls of the slide block 22 and the slide chute 12 is provided with a guide chute 122, the protrusion 222 can slide and fit in the guide groove 122 to further provide a guide for the slide block 22, thereby increasing the sliding smoothness of the slide block 22 and ensuring the abutting effect of the piece to be transported 100.

In the present embodiment, at least two protrusions 222 are arranged on both sides of the slide block 22, and the guide grooves 122 are arranged on the two side walls of the chute 12. Each protrusion 222 can slide and fit in the corresponding guide groove 122 to further improve the guiding function of the slide block 22.

Furthermore, the upper side wall of the mounting groove 11 is further provided with an avoidance groove 13 to avoid the sliding of the slide block 22, thereby ensuring the automatic decoupling of the piece to be transported 100. In addition, the avoidance groove 13 can further reduce the weight of the delivery structure.

Furthermore, the mounting piece 1 comprises two shells arranged opposite each other, which are enclosed to form the chute 12, the mounting groove 11, and the avoidance groove 13 to facilitate the processing and assembly of the reset assembly 2.

In particular, at least one second thread hole is arranged on a shell, and a hole corresponding to the second thread hole is arranged on the other shell. The delivery structure still comprises a fastener 4. The fastener 4 can pass by the through hole and be threaded into the second thread hole, thereby realizing the connection of the two shells.

Furthermore, there are at least two delivery structures, and each delivery structure is connected with the UAV body to improve the UAV transport capability and expand UAV range of usage.

It is understood that each delivery structure may be used to lift or deliver apiece to be transported 100, and each delivery structure may also be used to lift or deliver at least two pieces to be transported 100. The structure can be set according to the actual transportation needs, and this embodiment makes no restrictions on this.

In the description of the description, it should be noted that, the terms "Center", "Top", "Bottom", "Left", "Right", "Vertical", "Level", "Inside", "Outside" indicate a position or position relationship based on the position or position relationship shown in the attached drawings, for the sole purpose of facilitating and simplifying the description of the embodiment. The terms do not indicate or imply that the device or structure referred to must have a specific orientation or must be constructed and operated in a specific orientation. Therefore, it cannot be understood as a restriction to the application. In addition, the terms "First" and "Second" are used only to describe the purpose and cannot be understood as indicating the importance level. Wherein, the terms "First position" and "Second position" are two different positions.

In the statement of the description, the reference terms "An embodiment", "Example", and so on mean that the specific feature, structure or material described in combination with the embodiment or example is included in at least one embodiment or example of the application. In this specification, indicative representations of the above terms do not necessarily refer to the same embodiments or examples.

The terms "Installed", "Connected", "Combined", "Fixed" should be understood in a broad understanding unless otherwise specified. For example, they may be fixed or dismountable connections; mechanical or electrical connections; direct or indirect connections through an intermediary; an internal connection between two elements or interactions between two elements. For the ordinary technical personnel in the field, the concrete meaning of the above-mentioned terms in the application shall be understood according to specific conditions.

Unless otherwise specified, the first feature "Up" or "Down" on the second feature may include direct contact between the first feature and the second feature; it may also include first features and second features that are not in direct contact but are in contact with each other through additional features. Moreover, that the first feature is "Above", "Over" and "On" the second feature includes that the first feature is directly above and obliquely above the second feature, or it simply means that that the first feature has a higher horizontal height than the second feature. Moreover, that the first feature is "Below", "Underneath" and "Under" the second feature includes that the first feature is directly below and obliquely below the second feature, or it simply means that the first feature has a lower horizontal height than the second feature.

In addition, the above-mentioned is a better embodiment of the application and applied technical principles. A technician in the field will understand that the application is not limited to the particular embodiment described here. For the technicians in the field, various obvious changes, readjustments and substitutions will still be within the protection scope of the application. Therefore, although the application is described in detail through the above embodiment, the application is not only limited to the above embodiment, but further includes equivalent embodiments within the design of the application. The scope of the application is determined by the scope of the attached claims.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A delivery structure for an unmanned aerial vehicle (UAV) to deliver a piece of cargo, the delivery structure comprises:
    a mounting piece (1) having a mounting groove (11) arranged on the mounting piece (1);
    wherein an opening direction of the mounting groove (11) extends upward, and the piece of cargo (100) is hooked into the mounting groove (11);
    a reset assembly (2) is configured to deform under a weight of the piece of cargo (100) when the piece of cargo (100) is lifted, and resets to drive the piece of cargo (100) away from the mounting groove (11) when the piece of cargo (100) touches a ground;
    a limiting piece (3) having a first end connected to the reset assembly (2) when the piece of cargo (100) is not lifted, and having a second end connected with the mounting piece (1) by magnetic adsorption to seal the opening of the mounting groove (11); and
    wherein when the piece of cargo (100) is lifted, the reset assembly (2) drives the limiting piece (3) to move thereby separating the second end from the mounting piece (1).

2. The delivery structure of an UAV according to claim 1, wherein the second end of the limiting piece (3) is provided with a first magnetic piece; a second magnetic piece is arranged on the mounting piece (1); wherein the second magnetic piece has a magnetism opposite to a magnetism of the first magnetic piece.

3. The delivery structure of an UAV according to claim 2, wherein:
    the first magnetic piece and the limiting piece (3) are detachable from each other; and/or
    the second magnetic piece and the mounting part (1) are detachable from each other.

4. The delivery structure of an UAV according to claim 1, wherein the first end of the limiting piece (3) and the reset assembly (3) are rotationally connected to each other.

5. The delivery structure of an UAV according to claim 1, further comprising a chute (12) disposed on the mounting piece (1) and connected with the mounting groove (11); wherein the reset assembly (2) is arranged in the chute (12); and wherein the reset assembly (2) includes a connected reset piece (21) and a slide block (22), the reset piece 21 is located between the slide block (22) and a bottom of the chute (12); the slide block (22) and the chute (12) slide together and are abutted against the piece of cargo (100); and wherein the limiting piece (3) is connected with the slide block (22).

6. The delivery structure of an UAV according to claim 5, further comprising a guide hole arranged on the slide block (22); wherein one side of the reset piece (21) is penetrated into the guide hole and abutted against a top wall of the guide hole.

7. The delivery structure of an UAV according to claim 5, wherein the reset assembly (2) further includes a guide piece (23) arranged at the bottom of the chute (12) wherein an end of the reset piece (21) that is away from the slide block (22) is sleeved on the guide piece (23).

8. The delivery structure of an UAV according to claim 5, wherein an upper side wall of the mounting groove (11) is further provided with an avoidance groove (13) to avoid the sliding of the slide block (22).

9. The delivery structure of an UAV according to claim 5, further comprising:
- a protrusion (222) disposed on one of 1.) a side wall of the slide block (22) and 2.) a side wall of the slide groove (12);
- a guide groove (122) disposed on the other of the 1.) the side wall of the slide block (22) and 2.) a side wall of the slide groove (12); and
- wherein the protrusion (222) slides and fits in the guide groove (122).

\* \* \* \* \*